April 12, 1966    J. M. SCHMIED    3,245,198
METHOD FOR PACKAGING ARTICLES WITH TRANSPARENT FILM
Original Filed Dec. 28, 1961    2 Sheets-Sheet 1

JOSEPH M. SCHMIED
INVENTOR.
KENDRICK and STOLZY
BY
ATTORNEYS

April 12, 1966  J. M. SCHMIED  3,245,198
METHOD FOR PACKAGING ARTICLES WITH TRANSPARENT FILM
Original Filed Dec. 28, 1961  2 Sheets-Sheet 2

JOSEPH M. SCHMIED
INVENTOR.
KENDRICK and STOLZY
BY
ATTORNEYS 3,245,198
METHOD FOR PACKAGING ARTICLES WITH TRANSPARENT FILM
Joseph M. Schmied, Millbrae, Calif., assignor to M-C-T Enterprises, Inc., Salinas, Calif., a corporation of California
Original application Dec. 28, 1961, Ser. No. 162,744. Divided and this application Aug. 7, 1964, Ser. No. 388,050
7 Claims. (Cl. 53—32)

This application is a division of my copending application Serial No. 162,744 filed Dec. 28, 1961, for Method and Apparatus for Field Wrapping Lettuce With Transparent Film.

This invention relates to the art of preparing goods for shipment and more particularly to a device and method of wrapping articles.

Although the present invention will have substantial utility in packaging both regularly and irregularly shaped objects, such as balls, ash trays, lamp bases and the like, and although the present invention is not to be limited to the specific applications described herein, it has been found useful in packaging of fruits and vegetables and especially in prepackaging head lettuce in preparation for shipment.

It is known to prepare head lettuce for shipment in a refrigerated condition after it has been cut in the field by placing the lettuce in perforate corrugated boxes, placing the boxes in an air-tight tank and vacuum cooling the lettuce, i.e., cooling it by withdrawing most of the air from the tank. In such a case, a small portion of the moisture in the lettuce is evaporated. This evaporation can cause the temperature of the lettuce to drop from field temperature to about 33° F. in approximately thirty minutes. The lettuce so prepared is then shipped to market under refrigeration. Fresh produce such as lettuce, carrots, broccoli and other vegetables, have also heretofore been individually wrapped both prior to shipment and by retailers prior to sale. This has been done during the past few years, because there has been an increasing demand on the part of the consuming public to have commodities, particularly food, displayed and sold in transparent wrapping material. Commodities such as foods, including fruits and vegetables, wrapped with such a material, have a more attractive appearance to buyers than do such commodities when displayed in bulk. Notwithstanding the desirability of transparent wraps, retailers who do a moderate amount of business cannot afford to invest a large amount of capital in the purchase of equipment to wrap produce, particularly vegetables, prior to sale. It is desirable, therefore, that produce be wrapped prior to shipment. Heretofore, as far as I am aware, no low cost means have been provided to wrap produce conveniently, particularly in the field.

In the past, as aforesaid, produce has been individually packaged in transparent film both before and after shipment to market. Machines for so wrapping produce of which I am aware, are either complicated or ineffective. The complicated machines are difficult to use to field prepackage vegetables prior to shipment.

The present invention overcomes the above described and other disadvantages of the prior art by providing a method of packaging articles for shipment such as head lettuce, either before it is placed in the usual perforate boxes and vacuum cooled or thereafter. This method includes the steps of placing a section of wrapping material, such as transparent film over a slotted yieldable disc means having a hole therethrough surrounded on all sides, placing an article such as head lettuce over the top of the film and depressing the article through the disc means to wrap it. The wrapping material so used may advantageously be a conventional one that may be heat sealed and preferably one which may also be shrunk by heating.

In accordance with the present invention, the disc means is provided with a hole therethrough of an uninterrupted circumference, whereby excess film is gathered together at a restricted area on the article. The article so wrapped is then preferably passed through an oven or heat source to cause the film to shrink snugly around the article in accordance with the prior art practices.

Thus, in accordance with the present invention, field produce, such as head lettuce, may be more conveniently and economically prepackaged prior to shipment than it has been in the prior art. In such a case, wrapped produce, such as lettuce, will also better stand shipment and handling. It will also be further apparent that certain produce, such as cabbage, lettuce and broccoli, may be trimmed prior to packaging and a savings in shipping cost thereby effected.

The device of the present invention may be made relatively portable and thus produce may be easily and quickly prepackaged in the field after it is harvested. Freshness is also thus preserved. In addition, this device provides means to gather excess film at a position on a product being wrapped so that it may be easily and quickly heat sealed.

The film employed with the present invention may be of a conventional type known in the art as biaxially oriented polystyrene. The water vapor transmission rate of this film and the permeability of this film to air, oxygen and carbon dioxide are all of relatively high, as is well known. This film is thus useful when employed in wrapping produce and especially in prepackaging lettuce. In particular, although some limitation on the amount of oxygen permitted to contact lettuce may have some beneficial effect in preserving it and preventing oxidation, it may be preserved in better condition if the film employed in prepackaging is relatively permeable to oxygen and carbon dioxide. The known relatively high permeability to air and to water vapor of polystyrene film suggests the use thereof as wrapping or packaging material for leafy produce, such as lettuce. As stated previously, lettuce may be packaged in polystyrene film and the film heat sealed. Due to the fact that a heat seal is seldom perfectly air tight, water vapor may be withdrawn from a heat sealed package through a seal that is not air tight. Still further, film having perforations in it is commercially available and may be used in packaging lettuce in order that water vapor may be more rapidly withdrawn through the perforations in a lettuce package for increased speed of vacuum cooling.

The above described and other advantages of the present invention will be better understood from the following description when considered in connection with the accompanying drawings.

In the drawings, which are to be regarded as merely illustrative:

Figure 1:
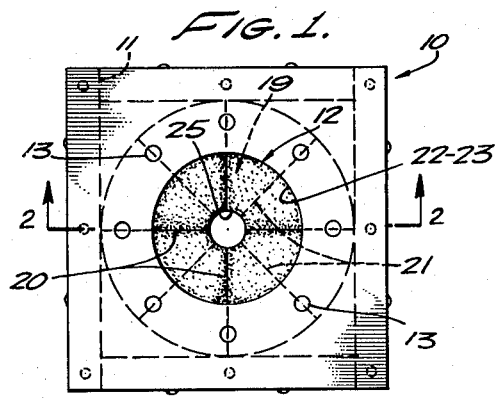
FIG. 1 is a top plan view of a packaging device constructed in accordance with the present invention.
Figure 2:
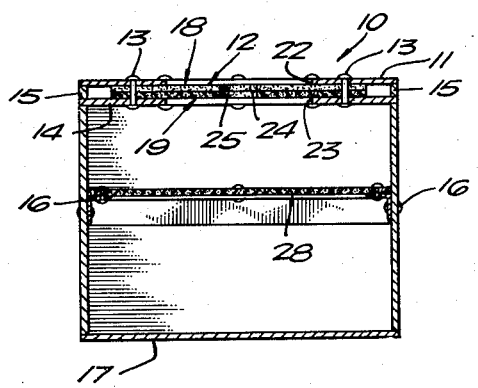
FIG. 2 is a sectional view taken on the line 2—2 of the device shown in FIG. 1.
Figure 3:
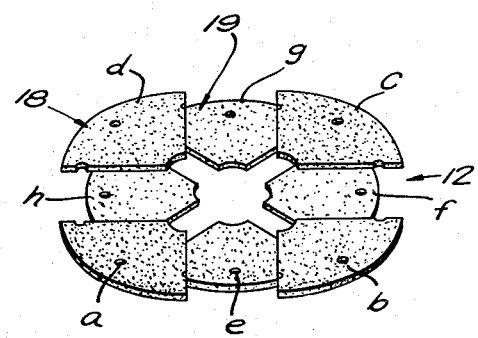
FIG. 3 is an exploded perspective view of disc means shown in FIGS. 1 and 2.

In the drawing in FIG. 1, a packaging device is indicated generally at 10 having a top platform 11 to which disc means generally indicated at 12 are secured by fastening elements 13 as shown in both FIGS. 1 and 2. Fastening elements 13 also hold a bottom platform 14 on the bottom side of disc means 12 in position. A complete enclosing structure including spacers 15, side panels 16 and a bottom panel 17 support plates 11 and 14. The packaging device 10 is completely symmetrical and for this reason only the section 2—2 is shown in FIG. 2. Disc means 12 is also again shown in FIG. 3 including an upper disc 18 and a lower disc 19. Upper disc 18 is slotted at four places to provide quarters a, b, c and d. Disc 19 is similarly slotted to provide quarters e, f, g and h. Note will be taken that the slots between quarters a, b, c and d lie at an angle of 45° from the slots between quarters e, f, g and h. The slots between quarters a, b, c and d are generally indicated at 20 in FIG. 1. The slots between quarters e, f, g and h are indicated at dotted lines 21 in FIG. 1.

From the foregoing, it will be appreciated that a biaxially oriented polystyrene film or any other kind of film or wrapping material may be placed over the top platform 11 of a size sufficient, for example, to wrap a head of lettuce. A lettuce head is then depressed downwardly through openings indicated at 22 and 23 in platforms 11 and 14 and through registering holes 24 and 25 in discs 18 and 19. After the lettuce head has been placed through the openings 22 and 23, a portion of the wrapping will extend upwardly through the registering holes 24 and 25 in discs 18 and 19 which may be both trimmed and heat sealed by a wire 35 shown in FIG. 9 or simply heat sealed thereby. Note will be taken that the disposition of the slots 21 relative to slots 20 make it substantially impossible for a fold of wrapping material to become lodged in either slots 20 or 21, the same not having been achievable with prior art apparatus.

A strip of rubber 28 of rectangular cross section is fixed at its ends to side panels 16 as shown in FIG. 2 in order to permit a head of lettuce and a wrapping film to be depressed through disc means 12 to an appropriate position for sealing gathered folds at the top of a head. Strip 28 also lifts a partially wrapped head to an appropriate film sealing position when most of the film and the head are positioned below disc means 12 internally of the device 10 so that the film sealing iron does not touch the disc means 12.

Figure 4:
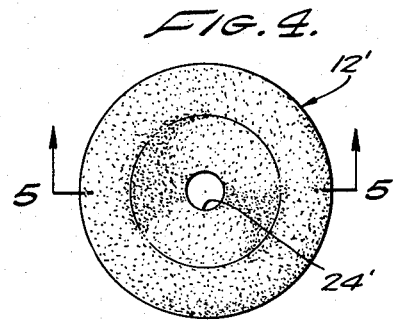
FIG. 4 is a top plan view of a packaging disc made in accordance with another embodiment of the present invention.

In accordance with the foregoing, it will be noted that it is desirable to have an uninterrupted hole through disc means 12. The same may be provided with a disc 12′ shown in FIG. 4. Discs 18 and 19, as well as disc 12′ may all be made of rubber, although the specific material of which these discs are made is immaterial except that they must be yieldable or resilient. The same is true of disc 12″ shown in FIG. 6.

Figure 5:
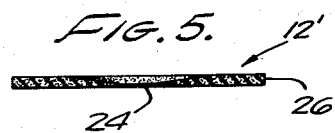
FIG. 5 is a sectional view taken on the line 5—5 of the device shown in FIG. 4.

Disc 12′ shown in FIG. 5 has a thickness increasing from the center thereof at a hole 24′ therethrough to an outer edge thereof indicated at 26.

Figure 6:
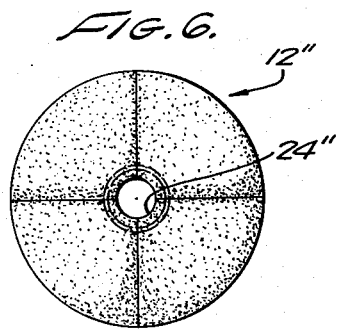
FIG. 6 is a top plan view of a packaging disc made in accordance with another embodiment of the invention.
Figure 7:
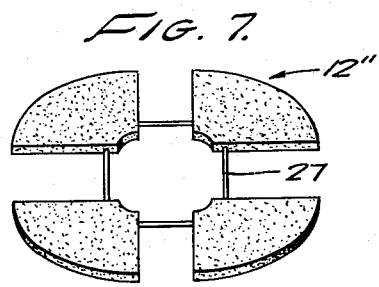
FIG. 7 is an exploded perspective view of the disc shown in FIG. 6.

A disc 12″ shown in FIGS. 6 and 7 is identical to disc 18 with the exception that an elastic cord 27 is threaded through it around a hole 24″ through disc 12″.

Figures 8, 9:
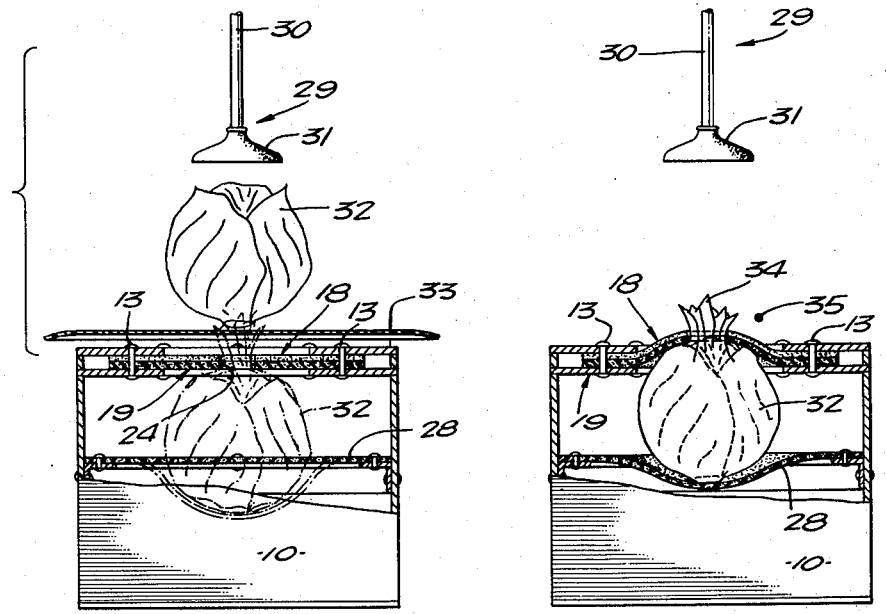
FIG. 8 is a side elevational view of a portion of a machine illustrating how the device shown in FIG. 1, 2 and 3 may be employed to wrap a head of lettuce.
FIG. 9 is a side elevational view of the machine of FIG. 8 illustrating how film folds are gathered on a head of lettuce prior to trimming the film.

In FIG. 8, a portion of a machine 29 is shown including a shaft 30 having a rubber cup 31 fixed to the lower end thereof to depress a head of lettuce 32 on a square section of polystyrene film 33 through openings 24 and 25 of disc means 12.

Figure 10:
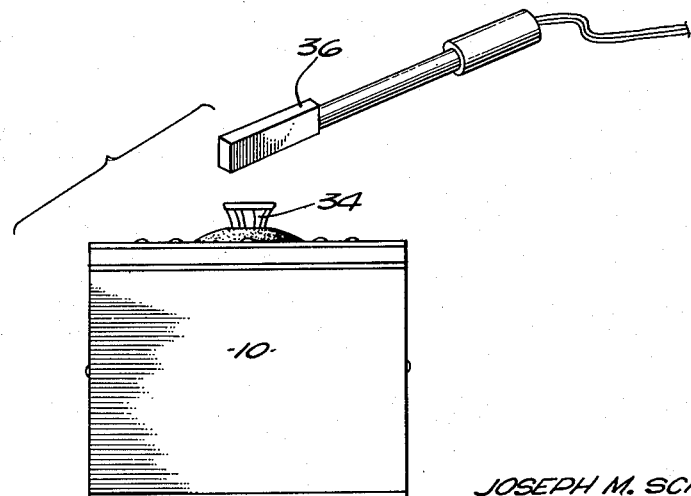
FIG. 10 is a side elevational view of the device shown in FIGS. 1, 2 and 3 illustrating a conventional heat sealing step for prepackaging film.

FIG. 9 shows folds 34 of film 33 gathered by disc means 12 at the top of lettuce head 32 held in appropriate trimming and heat sealing positions by strip of rubber 28, also shown in FIG. 9. Also shown in FIG. 9 is a wire 35, which may be heated by passing electric current therethrough, to trim the top of folds 34. Folds 34 may then appear as indicated in FIG. 10 and may be folded over the top of lettuce head 32 and heat sealed with a conventional iron 36 as shown in FIG. 10.

In accordance with the present invention, as in the prior art, lettuce heads may be individually wrapped. They may be wrapped before or after vacuum cooling or shipment and in transparent films as is also conventional. It is to be noted especially that conventional films having a relatively high known water vapor transmission and a relatively high known permeability to air and gasses, such as oxygen and carbon dioxide, are especially useful when employed with the present invention. Although oxidation of lettuce may be retarded in some respects by limiting the amount of oxygen in contact therewith, some produce and lettuce, especially may be preserved in better condition for a longer period of time if oxygen, carbon dioxide and water vapor are allowed to pass through the film employed in wrapping. In the past, this has been called the "breathing" requirement of lettuce. Still further, film having the properties of relatively high water vapor transmission and air permeability will not unduly interfere with subsequent vacuum cooling of produce wrapped therewith.

In practicing the present invention, the "breathing" requirement of lettuce and the water vapor and air permeability requirement of vacuum cooling both may be met by employing conventional films having relatively high known water vapor and gas permeabilities such as biaxially oriented polystyrene films. One such film is sold under the trade name "Trycite," and another is sold under the trade name "Polyflex."

The water vapor transmission of "Trycite" is about six grams per 100 square inches of film in twenty-four hours at 100° F. and at 90 percent relative humidity for a film .001 inch thick. A film .00125 inch thick may be used in accordance with the present invention to prepackage head lettuce, but the thickness of the film is not critical and small thicknesses may be employed. The permeability of "Trycite" to air, oxygen and carbon dioxide in cubic centimeters of dry gas transmission per 100 square inches of film in twenty-four hours at 77° F. and at one atmosphere of pressure are, respectively, 60, 210 and 930 for a film .001 inch thick.

The water vapor transmission of "Polyflex" according to a test similar to ASTM E96 described in "WVTR of Oriented Polystyrene," Modern Packaging, December 1958, is about 4.4 grams per 100 square inches of film in twenty-four hours at 100° F. and at a relative humidity of 95 percent for a film .001 inch thick. The permeability ranges of "Polyflex" to air, oxygen and carbon dioxide in cubic centimeters of gas per 100 square inches of film in twenty-four hours at 73° F. and at one atmosphere of pressure according to an ASTM D–1434–58 test are, respectively, 62 to 90, 213 to 300, and 790 to 926 for a film .001 inch thick.

From the foregoing, it will be appreciated that the wrapping procedure outlined hereinbefore may be performed in the field at the very location where lettuce is being cut. Lettuce so packaged may be passed through heat tunnels to shrink the transparent film thereon as is conventional. Conventional biaxially oriented polystyrene film may be used.

Also in accordance with the present invention, the device 10 provides means whereby excess film may be gathered together at the area of holes 25 and 26. The gathered film is then heat sealed in accordance with the prior art.

In practicing the present invention, the freshness of lettuce may be preserved by packaging immediately after harvesting in accordance with the prior art. The film, after it has been shrunk to a size firmly and snugly fitting a lettuce head, prevents damage or deterioration of the outer leaves of the head.

Although no material handling equipment has been described or illustrated herein, it is to be noted that any conventional conveyor system may be employed to bring articles to be wrapped to the wrapping device of the present invention and to transport wrapped articles away therefrom.

It is a feature of the present invention that discs 18 and 19 are resilient and can thereby accommodate different sizes of articles to be wrapped without further adjustment.

Note will be taken that the present invention may be employed to package produce not only in the field, but also in packing sheds at shipping points, in terminals at receiving points, and in retail stores.

Although certain advantages are obtained through the use of several detailed steps and constructions set forth herein, according to some of the broad concepts of the present invention these particular steps and constructions are not essential. For example, neither shrink film nor a heat tunnel for shrinking the film need necessarily be employed. The method and apparatus of the present invention is also not limited to the packaging of head lettuce or any other object having a generally spherical shape. For example, elongated rectangular objects or any object of an irregular shape may be packaged with the use of the present invention.

Although only a few specific embodiments of the invention have been described and illustrated, many changes and modifications thereof will of course suggest themselves to those skilled in the art. The invention is therefore not to be limited to the specific embodiments illustrated and described, the true scope thereof being defined only in the appended claims.

What is claimed is:

1. The method of packaging articles for shipment, said method comprising the steps of: placing a section of wrapping material over a device including a yieldable disc slit radially from a central location to provide flaps; placing an article over the top of said material; pushing said article all the way through said disc flaps to a position such that folds of said wrapping material are formed adjacent said article which extend upwardly through said disc; raising said partially wrapped article to a position in pressure contact with said disc; and securing said wrapping material folds together.

2. The method of packaging articles for shipment, said method comprising the steps of: placing a section of wrapping material over a device including a yieldable disc slit radially from a central location to provide flaps, said disc having two separate layers, the flaps of one of said layers overlapping the slits in the other and vice versa; pushing said article all the way through said disc flaps to a position such that folds of said wrapping material are formed adjacent said article which extend upwardly through said disc; raising said partially wrapped article to a position in pressure contact with said disc; and securing said wrapping material folds together.

3. The method of packaging articles for shipment, said method comprising the steps of: placing a section of wrapping material over a device including a yieldable disc slit radially from a central location to provide flaps, said device also including resilient means to urge a body outwardly of said disc, said disc having two separate layers, the flaps of one of said layers overlapping the slits in the other and vice versa, said device also including resilient means to urge a body outwardly of said disc; pushing an article all the way through said disc flaps to a position such that folds of said wrapping material are formed adjacent said article which extend upwardly through said disc; releasing pressure on said article to permit said resilient means to raise said partially wrapped article to a position in pressure contact with said disc; and securing said wrapping material folds together.

4. The method of packaging articles for shipment, said method comprising the steps of: placing a section of a wrapping sheet over a yieldable disc having means to form an opening therethrough, said device also including resilient means to urge a body outwardly of said disc; placing an article over the top of said material; pushing said article all the way through said disc to a position such that folds of said wrapping sheet sections are adjacent said article which extend upwardly through said disc opening, said article thereby spreading said disc apart and allowing said disc to return to a nearly unstressed position surrounding the folds of said wrapping sheet section as aforesaid; releasing pressure on said article to permit said resilient means to raise said partially wrapped article to a position in pressure contact with said disc; and securing said wrapping sheet section folds together.

5. The method of packaging articles for shipment, said method comprising the steps of: placing a section of a wrapping sheet over a yieldable disc having means to form an opening therethrough; placing an article over the top of said sheet section; depressing the article through the disc past the maximum transverse dimension thereof to cause the sheet section to encompass the bottom and sides of the article and to cause the edges of the sheet section to extend upwardly from the top of the article and be held within a relatively small area thereon by return of said disc to a nearly unstressed position; moving said partially wrapped article backwardly into pressure contact with said disc; and securing the said upwardly extending sheet section edges together while they project through said opening.

6. The method of packaging articles for shipment, said method comprising the steps of: placing a section of a wrapping sheet over a yieldable disc having means to form an opening therethrough; placing an article over the top of said sheet section; depressing the article through the disc past the maximum transverse dimension thereof to cause the sheet section to encompass the bottom and sides of the article and to cause the edges of the sheet section to extend upwardly from the top of the article and be held within a relatively small area thereon by return of said disc to a nearly unstressed position; moving said partially wrapped article backwardly into pressure contact with said disc; and heat sealing the said upwardly extending sheet section edges together while they project through said opening.

7. The method of packaging articles for shipment, said method comprising the steps of: placing a section of a wrapping sheet over a resilient disc having means to form an opening therethrough; placing an article over the top of said sheet section; depressing the article through the disc past the maximum transverse dimension of the article to cause the sheet section to encompass the bottom and sides of the article and to cause the edges of the sheet section to stand up in folds from the top of the article and be held within a relatively small area thereon by return of said disc to a nearly unstressed position; raising the thereby partially wrapped article to a position closer to but not back through said disc; and fastening the said folds together while they project through said opening.

References Cited by the Examiner

UNITED STATES PATENTS

| 1,597,528 | 8/1926 | Lauenstein | 53—221 |
| 2,218,293 | 10/1940 | Muller | 53—221 |
| 2,439,164 | 9/1948 | Haslacher | 99—171 |
| 2,718,107 | 9/1955 | Vaughan | 53—227 |
| 3,134,679 | 5/1964 | Dreyfus | 99—171 |

A. LOUIS MONACELL, *Primary Examiner.*

RAYMOND N. JONES, *Examiner.*